UNITED STATES PATENT OFFICE.

JOHN L. KELLER, OF CHARLESTON, WEST VIRGINIA.

MOLDING COMPOSITION.

1,421,954.     Specification of Letters Patent.     Patented July 4, 1922.

No Drawing.     Application filed February 28, 1921. Serial No. 448,643.

*To all whom it may concern:*

Be it known that I, JOHN L. KELLER, a citizen of the United States of America, residing at 719 Pennsylvania Ave., Charleston, in the county of Kanawha and the State of West Virginia, have invented a new and useful Molding Composition, of which the following is a specification.

My composition consists of the following ingredients, combined in the proportions stated, viz:

| | |
|---|---|
| Water | $17\frac{1}{2}\%$ |
| Paper | $35\%$ |
| Saw dust | $20\%$ |
| Cement | $10\%$ |
| Lamp black | $4\%$ |
| Paris green | $4\%$ |
| Linseed oil | $3\%$ |
| Wheat flour | $2\frac{1}{2}\%$ |
| Brick dust | $4\%$ |

Make pulp out of paper and water; mix with sawdust and cement. After mixing to a pulverized, pulpy form, color with lamp black, Paris green and brick dust to color desired. Mix well and add flour paste and linseed oil. This will insure the mixture to stick fast to anything and harden after drying.

The composition may now be applied to the article to be decorated and can be shaped into design desired, giving a very unique effect of any color of wood or bark. When decoration is completed, dry slowly by artificial or natural heat, giving ample time to set—three or four days.

What I claim and desire to secure by Letters Patent of the United States is—

1. The herein described molding composition, consisting of water, paper, saw dust, cement, lamp black, Paris green, linseed oil, wheat flour and brick dust substantially as described and for the purposes specified.

2. A molding composition consisting of, water $17\frac{1}{2}\%$, paper $35\%$, saw dust $20\%$, cement $10\%$, lamp black $4\%$, Paris green $4\%$, linseed oil $3\%$, wheat flour $2\frac{1}{2}\%$ and brick dust $4\%$.

In testimony whereof I have signed my name to this specification.

JOHN L. KELLER.